United States Patent [19]

Tu et al.

[11] Patent Number: 5,224,024
[45] Date of Patent: Jun. 29, 1993

[54] RETAINING FRAME FOR COMPONENTS OF A PERSONAL COMPUTER

[75] Inventors: Wen-tsai Tu, Taipei Hsian; Chyi-song Chen, Yulin Hsian, both of Taiwan

[73] Assignee: Acer Incorporated, Hsin Chu, Taiwan

[21] Appl. No.: 829,760

[22] Filed: Feb. 3, 1992

[51] Int. Cl.⁵ .......................... H02B 1/01; H05K 7/14
[52] U.S. Cl. ...................................... 364/429; 361/380
[58] Field of Search ........................ 364/708; 360/137; 361/380, 390, 391, 392, 395, 399, 429

[56] References Cited

PUBLICATIONS

IBM Technical Disclosure Bulletin, "Personal Computer Structure Designed For Robotized Assembly", vol. 30, No. 3, Aug., 1987.

*Primary Examiner*—Leo P. Picard
*Assistant Examiner*—Michael W. Phillips
*Attorney, Agent, or Firm*—Kenneth M. Kaslow

[57] ABSTRACT

A retaining frame for components of a personal computer comprises a horizontal portion, with a first section and a second section connected together; and a vertical portion attached substantially perpendicular to the first and second sections. The first section is adapted to secure a disk drive holder, and has at least one leg extending downward to support the retaining frame. The second section is adapted to secure a power supply, and has at least one leg extending downward to support the retaining frame. The vertical portion comprises a speaker seat and a ventilation fan seat at a central location near the first section, and speaker securing rib and fan securing device, respectively, for fastening a speaker and a ventilation fan. The retaining frame with a disk drive holder, power supply, speaker and the ventilation fan mounted thereon is disposed on the lower portion of a computer case, and secured inside the case by a vertical force exerted on the retaining frame by an upper portion of the computer case.

14 Claims, 3 Drawing Sheets

RETAINING FRAME FOR COMPONENTS OF A PERSONAL COMPUTER

BACKGROUND OF THE INVENTION

1. Field of the Invention

This invention relates generally to a retaining frame for the components of a personal computer, and particularly, to a frame having a first portion for securing a disk drive holder, a second portion for securing a power supply, and a third portion for retaining a speaker and ventilation fan.

2. Description of the Prior Art

Modern computers including personal computers comprise a great number of parts. This great number of parts would cause computers to occupy a great deal of space, were it not for engineers who design compact configurations and arrangements for the computer parts. As a result of these design efforts, computers are much less bulky. This is especially so for personal computers, which now need to occupy only a corner of a desk.

One drawback of this compact arrangement of parts is an increase in the amount of labor required to assemble and disassemble the computer. Increased effort is also required to service and maintain the parts within the computer, not only because of the smaller amount of space within which to work, but also because of the usually disordered arrangement of parts that is necessary to achieve a compact configuration.

Another conventional feature of computer construction is the use of screws as fastening devices for securing computer parts. The use of screws makes the maintenance of a personal computer very inefficient and troublesome, especially when screws are located deep within the computer casing.

SUMMARY OF THE INVENTION

In accordance with the present invention, an improved retaining frame for personal computer components comprises a horizontal portion having a first section and a second section defining an opening; and a vertical portion positioned substantially perpendicular to the horizontal portion along its longitudinal edge. The first section serves as a seat for a disk drive holder, and is equipped with guiding posts that position and secure the disk drive holder on the first section. The second section serves as a seat for securing a power supply, and is provided with pawls that snap onto openings formed on the power supply. The vertical portion defines a speaker seat to hold a speaker and a fan seat to secure a ventilation fan. The vertical portion provides supporting slats to accommodate a power switching link and fasteners to hold an interface card.

The retaining frame of the present invention advantageously secures components such as a disk drive holder, a power supply, a speaker, and a ventilation fan. The components are attached to the retaining frame with fastening means other than screws, and the frame is disposed inside a computer case for easy removal from and installation into the case to enhance the efficiency of computer maintenance.

The retaining frame of the present invention includes support means for more securely holding an interface card which is plugged into an expansion slot of the computer motherboard.

The retaining frame also positions the ventilation fan proximate the computer components that generate the most heat, such as the power supply and the Central Processing Unit (CPU), to improve the fan's cooling efficiency. Furthermore, the ventilation fan is situated so as to greatly reduce the noise generated by the fan.

DESCRIPTION OF THE PREFERRED EMBODIMENT

Figure 1:
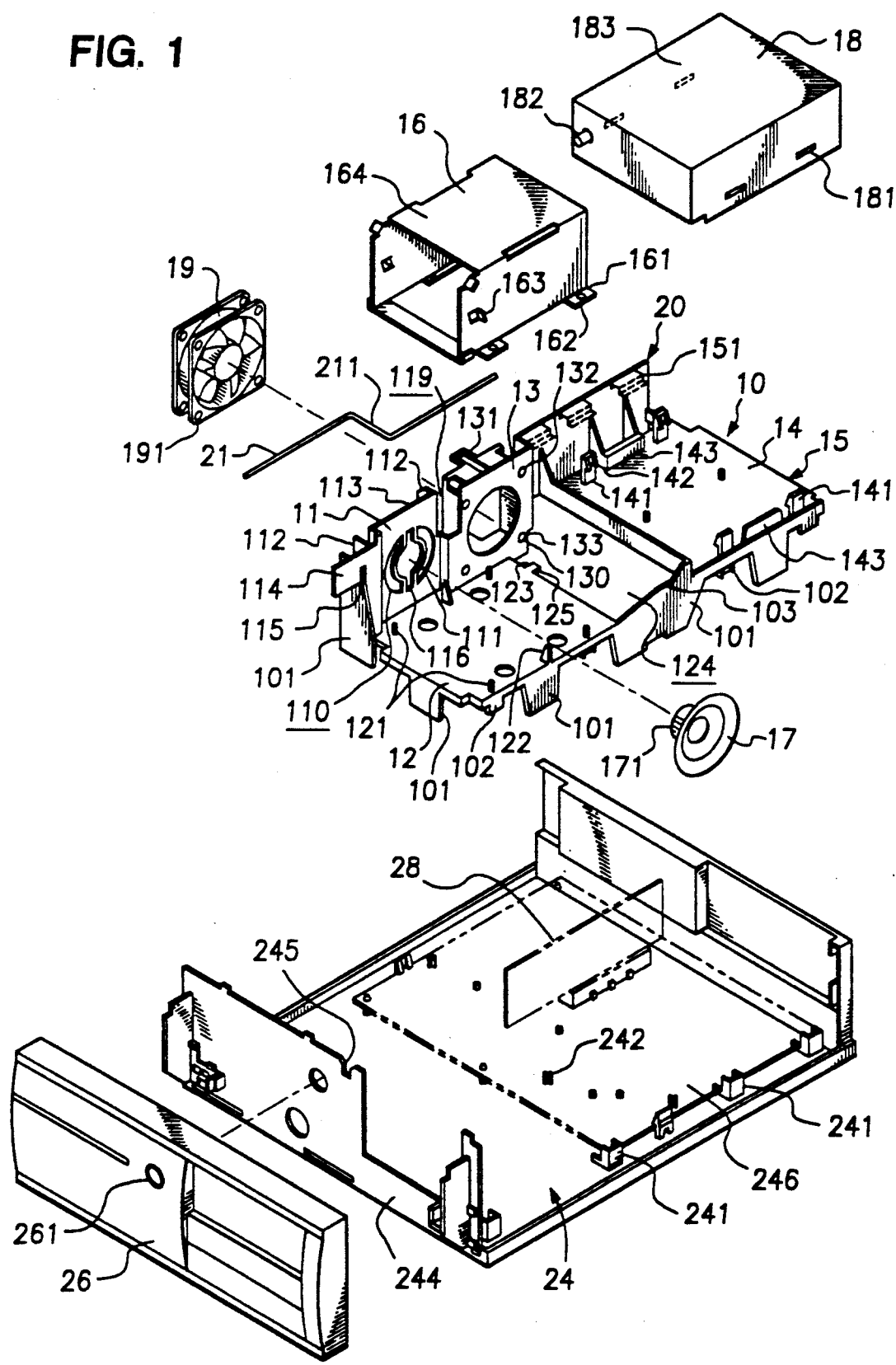
FIG. 1 is an exploded perspective view showing a preferred embodiment of the retaining frame of the present invention along with a personal computer case, a mother board, a disk drive holder, a power supply, a speaker, a ventilation fan, and a power switching link.
Figure 2:
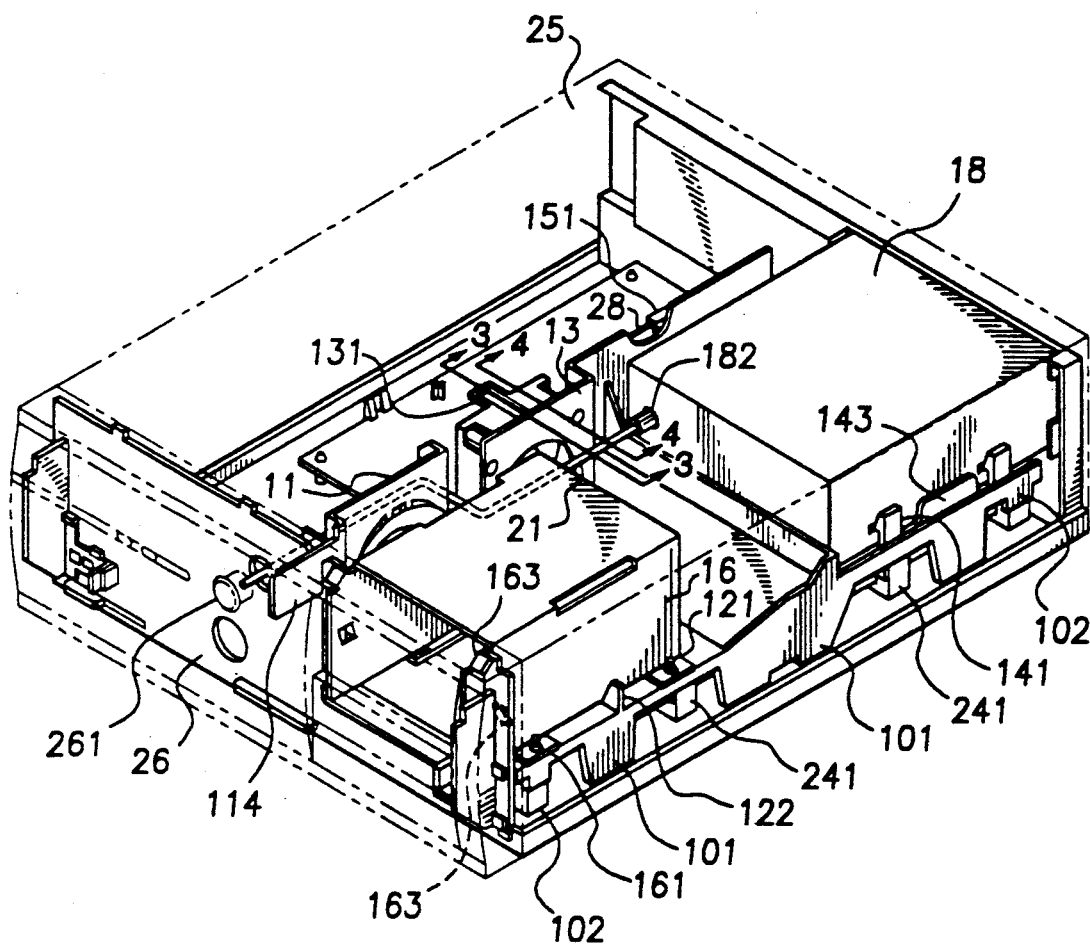
FIG. 2 is a perspective view showing the retaining frame of FIG. 1 attached to the above-mentioned parts with the case being shown in phantom.

Referring now to FIGS. 1 and 2, a personal computer comprising a case (only the lower portion 24 of which is shown in FIG. 1), a control panel 26, computer parts and a retaining frame 10 constructed in accordance with the present invention is shown. The retaining frame 10 is adapted to hold a disk drive holder 16, a power supply 18 with a first switch 182, a speaker 17, a ventilation fan 19 and a power switching link 21 mechanically connecting the first switch 182 and a second switch 261 disposed on the control panel 26 and securely held thereon without screws. The retaining frame 10 comprises a horizontal portion 15 and a vertical portion 20. Horizontal portion 15 and vertical portion 20 are attached to one another along their respective longitudinal edges so that vertical portion 20 is substantially perpendicular to horizontal portion 15.

Horizontal portion 15 comprises a first section 12 and second section 14 mounted together by connecting section 103 to define an opening 124 therebetween. The first section 12 and second section 14 are both preferably rectangular, and connected so that second section 14 lies in a plane which is vertically displaced from, and parallel to the plane in which the first section 12 lies. First section 12 and second section 14 are preferably constructed of a plastic material that is capable of supporting the disk drive holder 16 and the power supply 18.

The first section 12 serves as a seat for the disk drive holder 16. Disk drive holder 16 is a casing for securing disk drives (not shown) as well known in the art. Formed on the first section 12 are a plurality of guiding posts 121 to be received in holes 162, formed on lugs 161 of the disk drive holder 16. The guiding posts 121 ensure that the disk drive holder 16 is positioned on the first section 12 so that a disk drive (not shown) held by disk drive holder 16 will receive disks (not shown) through openings in the control panel 26 and a front piece 244 of the lower portion 24. The first section 12 further has a pair of wedged guiding plates 122 disposed at opposite ends of its top side that guide the disk drive holder 16 into proper position as it is mounted on the first section 12.

The second section 14 serves as a seat for the power supply 18. A plurality of pawl supports 141 extend upwards from the second section 14. A pawl 142 is formed on the top of each pawl support 141. The pawls 142 snap into respective openings 181 formed on the exterior walls of the power supply 18, thereby securing the power supply 18 on the retaining frame 10. To more securely hold the power supply 18, the second section 14 has a pair of holding plates 143 that tightly abut against the walls of the power supply 18 when the power supply 18 is positioned on the seat 14.

Cables and wires (not shown) of the power supply 18 and the disk drive holder 16 pass through the opening 124 so that they may be connected to a motherboard 246 of the computer.

A speaker seat 11 is formed in the vertical portion 20 at a central location near the first section 12 so that a speaker 17 mounted in speaker seat 11 will face the disk drive holder 16 which has been seated on first section 12. The speaker seat 11 comprises a pair of opposing ribs 111 which are disposed inside a hole 110. The ribs 111 have a middle portion which forms a resilient zone 116 for receiving and pinching a collar portion 171 of the speaker 17 to secure the speaker 17 to the vertical portion 20.

A ventilation fan seat 13 is also formed on the vertical portion 20, adjacent to the speaker seat 11 on the side proximate to the power supply seat 14. This places the ventilation fan seat 13 near the center of the vertical portion 20 where a fan 19, when mounted in the ventilation fan seat 13, cools the major heat-generating components in a computer, such as a CPU (not shown) and a power supply 18. The fan 19, when mounted in the fan seat 13, vents to the outside through a ventilation hole (not shown) of the upper case of the computer.

At both sides of the speaker seat 11, slats 112 extend vertically and are attached to the surface of the vertical portion 20 that faces away from the horizontal portion 15. Formed in each of the slats 112 is a supporting slot 113 for partially receiving the power switching link 21. The power switching link 21 is preferably a metal bar for coupling the first switch 182 of the power supply 18 with the second switch 261 the control panel 26. A rubber bushing around the switch 182 links one end of the power switching link 21 with the first switch (not shown) of the power supply 18. The plastic second switch 261 is mounted on the other end of the power switching link 21, so that when the second switch 261 is pushed, the power switching link 21 is pushed forward, which in turn pushes the first switch of the power supply 18.

For the link 21 to couple the first switch of the power supply 1B and the second switch 261 on the control panel 26, the link 21 is bent 90 degrees perpendicular to the longitudinal axis of the link 21, and then bent again 90 degrees so that it is parallel with its original longitudinal axis. The bent middle portion 211 of the link 21 is received in notch 119 formed in the vertical portion 20, between the speaker seat 11 and the ventilation fan seat 13. With the link 21 so disposed, it mechanically connects the first switch to the second switch 261 so that the first switch will be turned on whenever the second switch 261 is turned on, and the first switch will be turned off whenever the second switch 261 is turned off.

Figure 3:
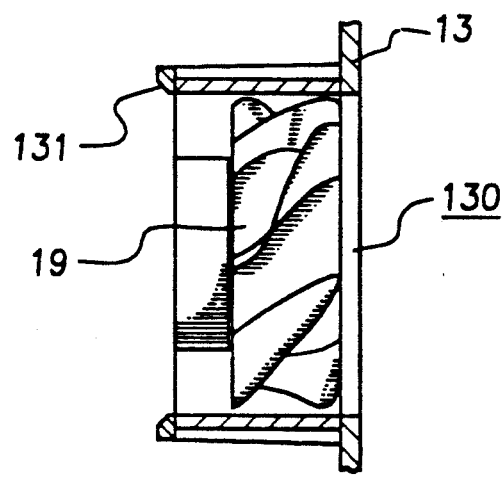
FIG. 3 is a partial cross-sectional view taken along line 3—3 of FIG. 2, showing the ventilation fan assembly on the fan seat of the retaining frame in accordance with the present invention.
Figure 4:
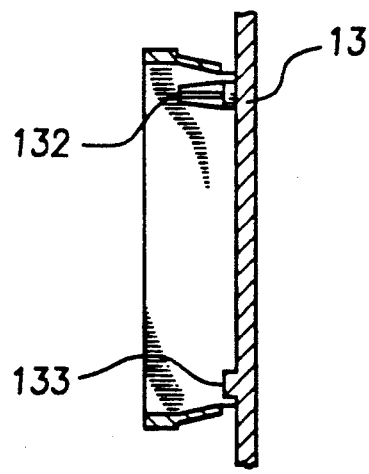
FIG. 4 is a cross-sectional view taken along line 4—4 of FIG. 2 showing the fan seat of the retaining frame.

With reference now to FIGS. 1, 3 and 4, the fan seat 13 defines a hole 130, serving as an air flow passage, and comprises two snap-on grippers 131 disposed at the top and bottom of the hole 130, respectively, to snap onto the outer edge of the fan 19, and thus, secure the fan 19 on the fan seat 13. The ventilation fan seat 13 also provides two allocating bosses 133 and two allocating pegs 132 to cooperate with four apertures 191 formed on the fan 19 (FIG. 1) in guiding the fan 19 into the proper placement on the fan seat 13.

Referring back to FIGS. 1 and 2, on the surface of the vertical portion 20 that faces away from the horizontal portion 15, are a plurality of inverted U-shaped fasteners 151 which are disposed near the top of the vertical portion 20 in the region of the vertical portion 20 that is adjacent to the second section 14. The inverted U-shaped fasteners 151 hook onto and hold an interface card 28 which is attached to an expansion slot of the motherboard 246.

The vertical portion 20 of the retaining frame 10 further comprises an extension 114 next to the speaker seat 11. The extension 114 extends towards the front piece 244 of the lower portion 24, and has a vertical slot 115 formed on its bottom edge to engage a corresponding slot 245 formed on the top edge of the front piece 244 of the lower portion 24. The retaining frame 10 also provides, about its periphery and on the underside, a plurality of legs 101 that extend vertically and stand on the lower portion 24 to support the retaining frame 10. The underside of the retaining frame 10 is further provided with a plurality of U-shaped cross section projections 102, each of which is supported by a footing 241 formed on the lower portion 24 to further support the retaining frame 10. Further, a supporting member 123 extends downward from an edge between the opening 124 and first section 12. A hole 125 is formed in the supporting member 123 which engages a post 242 on the lower portion 24 to provide further support. The heights of supporting member 123 and of the U-shaped cross section projections 102 and their corresponding footings 241 are designed to elevate the retaining frame 10 so that when all the discussed parts of the personal computer are completely assembled in the computer, the tops 164, 183 of the disk drive holder 16 and the power supply 18, respectively, abut against an upper casing 25 (shown in phantom in FIG. 2) which is disposed above all the discussed parts of the completely assembled personal computer. This provides a vertical constraint which secures all of the parts.

In the preferred embodiment, the disk drive holder 16 is provided with a pair of inclined guide lugs 163 on its lateral sides to guide the installation of the disk drive holder 16. The guiding lugs 163 serve as camming surfaces when they contact the front piece 244 of the lower portion 24, and thus, push the disk drive holder 16 into a correct position on the first section 12 of the retaining frame 10.

What is claimed is:

1. A retaining frame for a computer having a lower case portion, a front piece, an upper case portion, a power supply with a first switch, a control panel with a second switch, a motherboard, a disk drive holder, a speaker and a ventilation fan; said retaining frame comprising:

a horizontal portion having a first section and a second section, said first and second sections being attached together;

a disk drive holder securing means disposed on said first section for securing the disk drive holder;

a power supply securing means disposed on said second section for securing the power supply;

first and second legs attached to the first and second sections, respectively, said first and second legs extending downward to support the retaining frame at a height which causes the disk drive holder and the power supply, when mounted on the retaining frame, to contact the upper case portion to further secure the disk drive holder and the power supply to the retaining frame;

a vertical portion attached substantially perpendicular to said first and second sections, said vertical portion having a speaker seat and a fan seat proximate said first section;

a speaker securing means disposed on said vertical portion for securing the speaker;

a fan securing means disposed on said vertical portion for securing the fan; and a fan securing means dispose don said vertical portion for securing the fan; and a fastening means disposed on a side of said vertical portion facing away from said first and second sections for engaging a circuit card connected to the motherboard expansion slot.

2. The retaining frame of claim 1, wherein a first opening is defined between said first section and said second section, said first opening adapted to pass cables.

3. The retaining frame of claim 1, further comprising a pair of wedged plates disposed on said first section to guide the disk drive holder into a mounted position on said first section.

4. The retaining frame of claim 1, wherein said fastening means for engaging a circuit card connected to the motherboard expansion slot comprises an inverted U-shaped fastener, adapted to engage the circuit card.

5. The retaining frame of claim 1, further comprising a supporting member disposed on an edge of said first section bordering said second section, and extending downward therefrom to engage the lower case portion to provide further support for said retaining frame.

6. The retaining frame of claim 1, further comprising a power switching link for mechanically coupling the first and second switches.

7. The retaining frame of claim 6, wherein said vertical portion further comprises a pair of vertical slats with a supporting slot disposed in the vertical slats, said supporting receiving slot partially said power switching link.

8. A retaining frame for a computer having a lower case portion, a front piece defining a slot, an upper case portion, a control panel, a motherboard, a power supply defining a pawl opening on the exterior of the power supply, a disk drive holder having a plurality of disk drive holder lugs each lug defining a hole, a speaker having a collar portion and a ventilation fan having apertures for receiving pegs; said retaining frame comprising:

a horizontal portion having a first section and a second section, said first and second sections being attached together;

a disk drive holder securing means disposed on said first section for securing the disk drive holder;

a power supply securing means disposed on said second section for securing the power supply;

a first and second legs attached to the first and second sections, respectively, said first and second legs extending downward to support the retaining frame at a height which causes the disk drive holder and the power supply, when mounted on the retaining frame, to contact the upper case portion to further secure the disk drive holder and the power supply to the retaining frame;

a vertical portion attached substantially perpendicular to the first and second sections, said vertical portion having a speaker seat and a fan seat proximate said first section;

a speaker securing means disposed on said vertical portion for securing the speaker;

a fan securing means disposed on said vertical portion for securing the fan; and a fastening means disposed on said vertical portion and extending away from the first and second sections for engaging a circuit card connected to the motherboard expansion slot.

9. The retaining frame of claim 8, wherein said disk drive holder securing means comprises a plurality of guiding posts disposed on said first section, said guiding posts to be respectively in the plurality of disk drive holder lug holes.

10. The retaining frame of claim 8, wherein said power supply securing means comprises a plurality of pawls, each of said pawls being fixed on an end of a pawl support, said pawl support extending upward from said second section, each of said pawls being a wedged structure sized to snap into the corresponding pawl opening located on the exterior of the power supply.

11. The retaining frame of claim 8, wherein said speaker seat is a hole in said vertical portion, and said speaker securing means comprises a pair of ribs disposed inside said hole, each of said ribs having a resilient middle portion opposing each other and having an expandable portion to receive and pinch the collar portion of the speaker.

12. The retaining frame of claim 8, wherein said fan seat is a hole in said vertical portion and said fan securing means comprises a pair of snap-on grippers disposed around said hole for securing said ventilation fan.

13. The retaining frame of claim 12, wherein said fan securing means further comprises a plurality of allocating pegs to be received in respective apertures of the ventilation fan.

14. The retaining frame of claim 8, wherein said vertical portion further comprises a member formed adjacent the speaker seat, and extending in the direction of the front piece, said member having a slot thereunder to engage with the slot disposed in the front piece.

* * * * *